United States Patent
Boberg

[15] 3,687,054
[45] Aug. 29, 1972

[54] AIR OUTLET APPARATUS
[72] Inventor: John E. Boberg, Northridge, Calif.
[73] Assignee: Lockheed Aircraft Corporation, Burbank, Calif.
[22] Filed: Nov. 24, 1970
[21] Appl. No.: 92,398

[52] U.S. Cl. ............................... 98/33, 98/8, 98/9, 98/62
[51] Int. Cl. .............................................. F24f 9/00
[58] Field of Search .......... 98/8, 9, 20, 62, 38 B, 38 E, 98/33 A, 33 R, 32

[56] References Cited

UNITED STATES PATENTS

| | | | |
|---|---|---|---|
| 2,190,937 | 2/1940 | Demuth | 98/33 R |
| 2,613,587 | 10/1952 | MacCracken | 98/38 E |
| 2,640,411 | 6/1953 | Hans | 98/38 E |
| 3,217,788 | 11/1965 | Adam | 98/38 E |

FOREIGN PATENTS OR APPLICATIONS

| | | | |
|---|---|---|---|
| 355,576 | 8/1931 | Great Britain | 98/33 R |
| 718,740 | 11/1954 | Great Britain | 98/38 E |

Primary Examiner—William J. Wye
Attorney—Matthew P. Lynch

[57] ABSTRACT

A compact, low-weight air outlet apparatus cooperating with an air conditioning system for wide body jet aircraft to circulate large volumes of air without initiating annoying drafts, without causing condensation and without forming stagnation zones. This is accomplished by drawing in and mixing ambient cabin air and cool fresh air within the outlet apparatus and using the Coanda effect to diffuse and direct the air back into the cabin so as to prevent drafts and to form a circulation pattern to drive away and diffuse annoying smoke.

17 Claims, 2 Drawing Figures

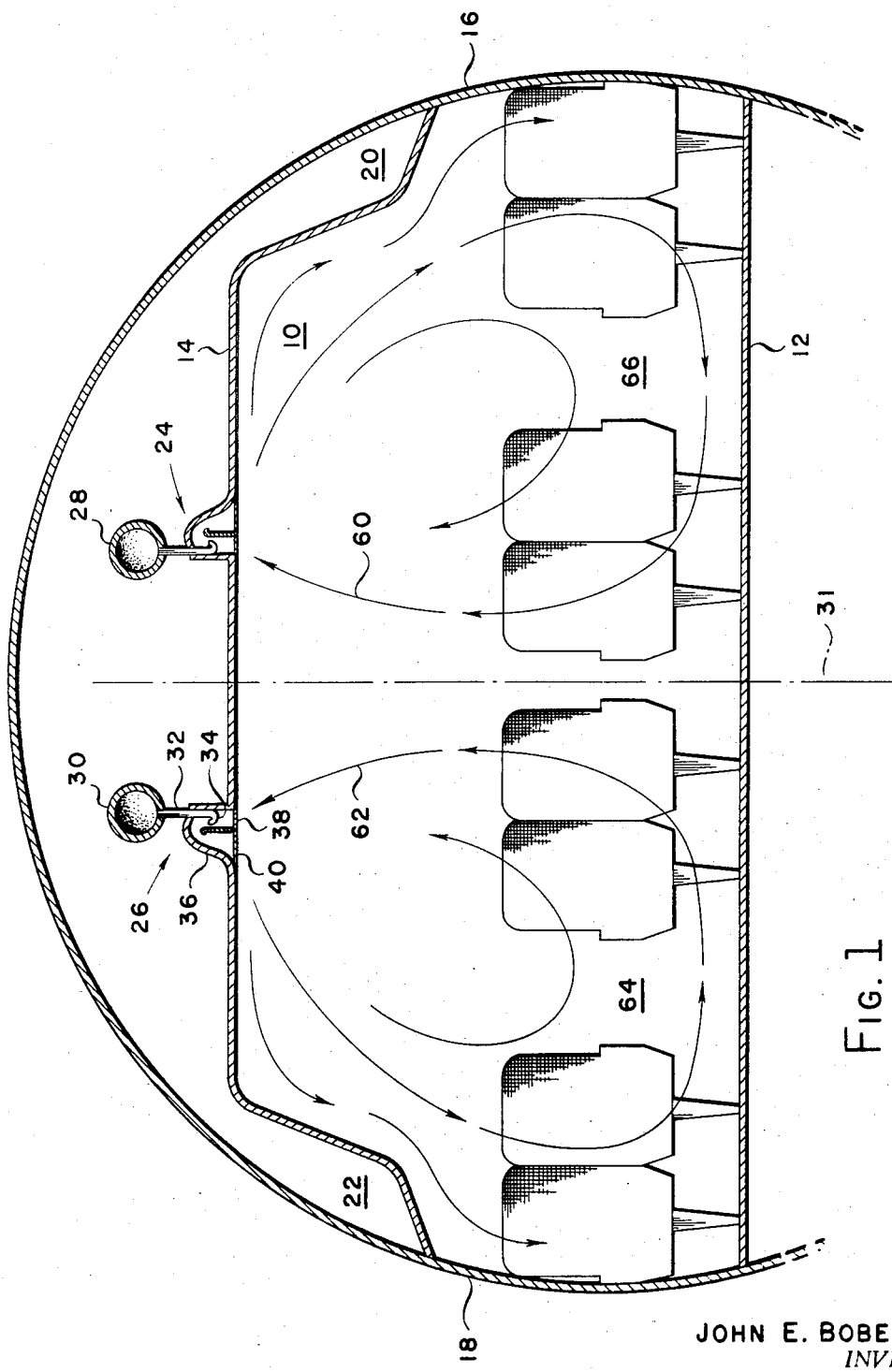
JOHN E. BOBERG
INVENTOR.

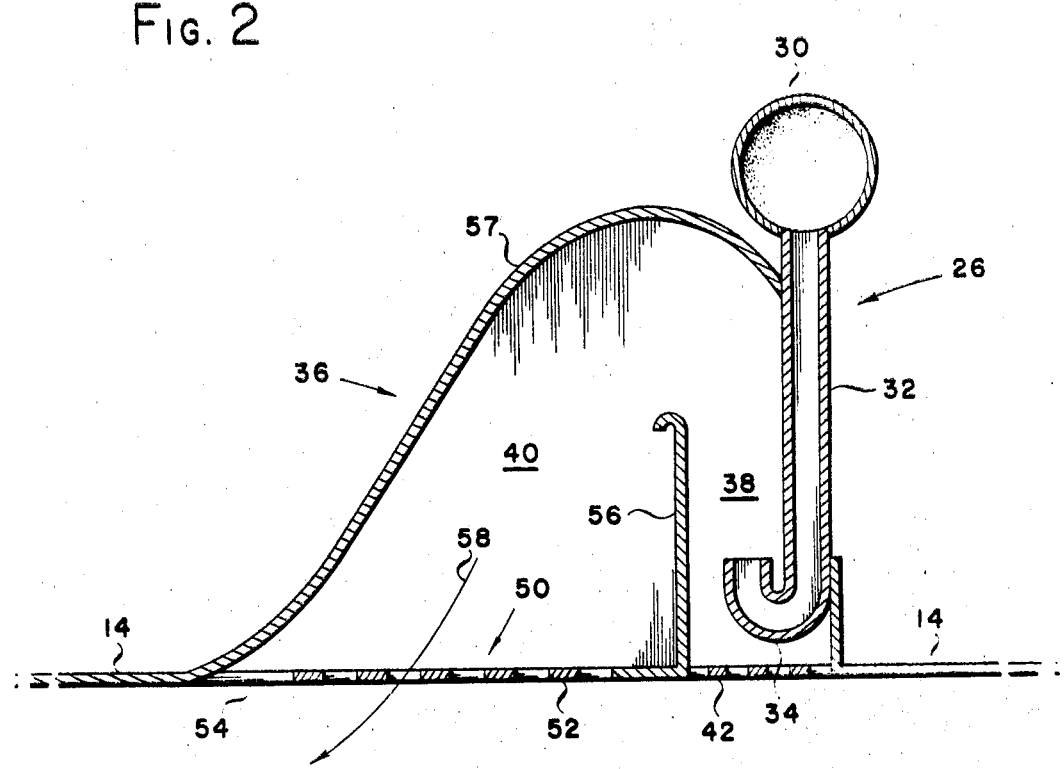

AIR OUTLET APPARATUS

BACKGROUND OF THE INVENTION

1. Field of the Invention

The present invention relates to an air outlet apparatus, and more particularly, to a compact, low-weight air outlet apparatus to be used as part of an air conditioning system for a passenger carrying vehicle, such as a commercial aircraft.

2. Description of the Prior Art

Development of air conditioning systems for passenger vehicles has always been an unusually difficult undertaking because of the many problems relating to the systems. The development of an air conditioning system for an aircraft is especially difficult because of the environment in which the system is to be used. Design criteria for such a system includes the circulation of a large volume of air in a relatively small space. There is an additional requirement that the large quantity of circulating air be substantially draft-free so as not to inconvenience or discomfort passengers. Still another requirement is that the air conditioning system be small and lightweight. Yet another desired feature relates to the effective dissipation of cigarette and cigar smoke.

With the advent of larger wide-body jet aircraft, the so-called "jumbo jets," the above-mentioned requirements have been accentuated. Because of the greater seating capacity of the larger planes, there is a need for even more air circulation with the same limitation of substantially no drafts. There is a further limitation in that the new larger jets are designed to have "floating" aisles, that is, aisle locations will vary from aircraft to aircraft depending upon the seating configuration, which in turn is dependent upon the passenger carrying capacity desired.

On older jet aircraft, such as the Boeing 707, relatively heavy ducts and fans are spaced along the ceiling above the central fixed aisle and provide the necessary air circulation. Because of the fixed aisle, air may be blown downwardly into the aisle without causing any passenger discomfort except for those who are moving along the aisle; since such a passenger is only momentarily exposed to the draft of cool air, the system is acceptable. However, depending upon where the exhaust openings are located on the older aircraft, there still remains the problems of adequate circulation and the prevention of stagnant regions of air where, for example, smoke may be allowed to accumulate. While the region of stagnation may be in the upper portion of the cabin away from the passenger seating areas, visual problems may arise when viewing an in-flight movie where the screen is placed toward the forward end of the cabin near its upper portion.

SUMMARY OF THE INVENTION

The present invention fulfills the requirements stated above and obviates the problems in the prior art by providing a compact, low-weight air outlet apparatus, cooperating with an air conditioning system for supplying air to a predetermined interior, comprising a housing having two input openings, the first input opening for passing cool fresh air, and a second input opening for passing ambient air from the cabin interior, and having an output opening; the output opening is divided into two portions, a first portion being partially restricted, and a second portion being unrestricted whereby air emitted through the first portion is directed by the air emitted through the second portion.

An object of the present invention is to provide an air outlet apparatus which mixes ambient environmental air with fresh cooler air from an air conditioning system to allow the air conditioning system to provide a minimum of fresh air at a maximum depressed temperature.

Another object of the present invention is to provide an air outlet apparatus which directs and diffuses air flow to prevent drafts upon anyone located in the environment.

An ancillary object of the present invention is to provide an air outlet apparatus which prevents noticeable fogging and/or which prevents condensation on the visible portions of the apparatus.

Still another aim of the present invention is to provide an air outlet apparatus which is compact in size, low in weight, easily manufactured, relatively inexpensive, and aesthetically pleasing in design.

A related object of the present invention is to provide an air outlet apparatus which establishes an air circulation pattern in the region occupied by passengers where air movement is either in a substantial downward direction or a substantial upward direction.

Other objects and advantages of the invention will appear from the following description taken in conjunction with the accompanying drawings.

BRIEF DESCRIPTION OF THE DRAWINGS

FIG. 1 is an elevational sectional view of the interior of a wide-body commercial aircraft; and FIG. 2 is an enlarged elevational sectional view of a portion of the FIG. 1 embodiment illustrating the air outlet apparatus in more detail.

DESCRIPTION OF THE PREFERRED EMBODIMENT

While the present invention is susceptible to various modifications and alternative constructions, an illustrative embodiment is shown in the drawings and will herein be described in detail. It should be understood, however, that it is not the intention to limit the invention the the particular form disclosed; on the contrary, the intention is to cover all modifications, equivalents and alternative constructions falling within the spirit and scope of the invention as expressed in the appended claims.

Referring now to FIG. 1, there is illustrated the cross-section of a cabin space 10 exemplifying the larger "-jumbo" jets presently coming into use. The cabin space is formed by a floor 12, a ceiling 14, and two sidewalls 16 and 18. The width of the cabin, that is from sidewall 16 to sidewall 18, is about 235 inches, and the length of the aircraft is such to accommodate between 250 and 350 passengers, depending upon the seating arrangement. For example, a seating arrangement of eight abreast is illustrated in FIG. 1, though this may be altered to a nine abreast or 10 abreast seating configuration. Generally, it is desirable to have approximately 20 cubic feet per minute per passenger of fresh air entering the cabin space, with an air circulation of about twice that amount, or 40 cubic feet per minute per passenger. As will be explained hereinbelow, the source for additional air circulation is from the air already in the cabin space. In addition to the eight seats, the cabin space has overhead compartments which are attached to the sidewalls, such as the compartment 20 attached to the sidewall 16 and the compartment 22 attached to the sidewall 18.

Shown in simplified form in FIG. 1, are two air outlet apparatus 24 and 26 which are connected, respectively, to an air conditioning system through fresh air ducts 28 and 30. The air outlet apparatus are connected to the ceiling 14 and located in the space above the ceiling within the upper portion of the aircraft. It is noted that the air outlet apparatus are positioned in a pair on both sides of the center line of the aircraft which is depicted by a reference line 31 bisecting the cabin space 10.

Referring now to FIG. 2, only one of the air outlet apparatus need be described in detail, since the other apparatus is identical. Thus, the air outlet apparatus 26 will be described herein.

To move fresh air from the air conditioning system into the cabin space, the duct 30 is connected to a fresh air input duct 32 having a U-shaped end portion 34. The input duct 32 is connected to a housing 36 which is divided into an input section 38 and an output section 40. The input section 38 is in communication with an input opening 42 of the housing 36 to allow existing cabin air to be drawn into the housing. In accordance with one of the important aspects of the present invention, the placement of the fresh air input duct 32 with its upturned end portion 34 serves as a pump causing the air within the cabin space to be drawn in and recirculated so as to substantially increase the total volume of air actually being moved into the cabin space. To accomplish the pumping action, the air being emitted from the fresh air input duct is at a fairly high velocity in an upward direction. This causes movement of the air adjacent the high velocity stream in the same direction as the stream thereby lowering the pressure about the opening 42. The low pressure region acts as a suction inducing air from the cabin space to enter through the opening 42 and flow upwardly through the input section 38 of the housing.

In accordance with still another important aspect of the present invention, the air outlet apparatus allows very cool air at high velocity to emanate from the cooler portion of the system without creating an undesirable draft upon passengers and without causing a fog or condensation at any outer portion of the air outlet apparatus, thereby eliminating any potential water dripping problem. For example, the air being emitted from the fresh air input duct is within a relatively cool temperature range of 35°-40° F. If this air was to mix with warmer air at an outlet grill, condensation would occur. To prevent this from happening, the warmer air from the cabin, which is at about 75° F., is drawn in by the high velocity fresh air input and mixed within the housing so that the resulting mixture of air is at some intermediate temperature, above the dew point, thereby eliminating any fogging or condensation problem. At the same time, the quantity of air circulated through the cabin space is the summation of the quantity of fresh input air plus the quantity of cabin air drawn in through the opening 42. This means that the air conditioning system is able to process a smaller quantity of air which is depressed to a very low temperature, thereby increasing efficiency.

The housing 36 includes an output opening which is divided into two portions, a main portion 50 partially blocked by a grill 52, and a smaller control portion 54. The input and output sections of the housing are separated by a baffle 56 so that the air flow from the input opening of the housing to the output opening follows a path requiring the air to make a 180° turn as it moves upward in the input section 38 around the baffle 56 and downward in the output section 40. As the air moves through this path, it is mixed so as to achieve a generally uniform temperature as it is emitted through the output opening.

In order to prevent direct drafts and to achieve the desired circulation pattern, the housing 36 includes a compound curved wall 57 which may be contiguous with the ceiling 14. The wall 57 forms one boundary of the output opening adjacent the control portion 54. The grill 52 is designed to partially block the output opening in a predetermined manner; in a preferred grill, there is a blockage of approximately 37 percent of the main portion of the output opening. In other words, the grill is approximately 63 percent open. Generally, if the output opening was unhampered, the air being emitted would move downwardly generally perpendicular to the position of the ceiling 14. However, by curving the wall 57, as shown, and partially restricting the main portion 50 of the output opening, the air being emitted through the control portion 54 acts to direct the entire air flow in a direction as depicted by the arrow 58. This phenomenon is commonly referred to as the Coanda effect. As more fully explained in the U.S. Pat. No. 2,052,869, to Coanda, a high velocity stream of fluid issuing from a suitable orifice into another fluid will carry along a portion of the other fluid so as to create a suction effect. When there is a surface along which air can flow smoothly, the air will flow along this surface while carrying along adjacent air. Since the control portion opening is unhindered, while the main portion opening is hindered, and since the smooth surface of the wall 57 is available, an airstream will "attach" itself to the wall 57 and flow out along or very close to the ceiling 14. This relatively high velocity flow will cause a suction on the remaining air in the outlet section of the housing biasing and diffusing the main portion of the air through the grill at some angle away from the vertical as indicated by the arrow 58. Since the stream of air attached to the wall 57 is relatively small, it will diffuse before reaching the level at which passengers are located, while the larger mainstream of air issuing through the grill 52 will be slower in velocity and diffused. Thus, a larger quantity or volume of air is moved without the usual draft.

It is to be noted that with the cabin configuration shown an optimum grill opening appears to be 63 percent; it is contemplated that with various other vehicle interior configurations, grill opening of varying percentages may be necessary to achieve optimum results.

Still another important aspect of the present invention is the circulation pattern developed by the air outlet apparatus described. Referring once again to FIG. 1, there is illustrated the air flow pattern set up within the cabin space. Because of the width of the aircraft, it is preferable to have the two paired air outlet apparatus 24 and 26 each creating a modified circular air flow pattern as indicated by the phantom arrows 60 and 62. More particularly, the air flow is more generally shown by the shaded regions which ensures that all of the seat positions are within the circulation regardless of the seating configuration in the aircraft. It is noted here that the two aisles 64 and 66 are somewhat movable depending upon the seating configuration so that air conditioning systems, like that described in the prior art which depended upon a fixed aisle width and location, would not be flexible enough for the new generation of aircraft.

It is noted that the two pairs of outermost seats are within an air flow pattern moving generally in a downward direction, while the two pairs of inboard seats are in an air flow pattern moving generally in an upward direction. This air circulation pattern is of substantial benefit when considering the smoking problem inherent in any confined environment. A smoker in any one of the seats in the cabin space will have his smoke moving downwardly or upwardly, depending upon the seat location, away from himself and away from his neighbor immediately adjacent. This is in contrast to prior art systems where smoke often moved laterally around the passengers adjacent the smoker. At the same time, the circulation pattern quickly diffuses the smoke and mixes it with fresh air. Because of the lack of dead or stagnant air pockets, there is no buildup of smoke or haze within the aircraft interior. Even though prior art systems eventually also drove the smoke away from the immediate vicinity of the passengers, stagnation often occurred near the ceiling causing a haze in the upper portion of the aircraft cabin space tending to obscure vision which becomes especially annoying when there is an in-flight movie with the screen being placed toward one end of the cabin adjacent the ceiling.

Pursuant to the requirements of the patent statutes, the principle of this invention has been explained and exemplified in a manner so that it can be readily practiced by those skilled in the art to which it pertains, or with which it is most nearly connected, such exemplification including what is presently considered to represent the best embodiment of the invention. However, it should be clearly understood that the above description and illustrations are not intended to unduly limit the scope of the appended claims, but that therefrom the invention may be practiced otherwise than as specifically described and exemplified herein, by those skilled in the art, and having the benefit of this disclosure.

Therefore, what I claim as patentably novel is:

1. An air outlet apparatus cooperating with an air conditioning system for supplying air to a predetermined interior comprising:
    a housing having two input openings, a first input opening for passing fresh air and a second input opening for passing air from the interior into said housing so as to mix the fresh and interior air therein, and having an output opening; said output opening divided into two portions, a first portion being partially restricted and a second portion being unrestricted whereby air emitted through said first portion is directed by the air emitted through said second portion.

2. An air outlet apparatus, as claimed in claim 1, wherein a wall of said housing adjacent said second portion of said output opening is curved in a direction along which emitted air is to be directed.

3. An air outlet apparatus, as claimed in claim 1, wherein said second input opening is positioned adjacent said first portion of said output opening which, in turn, adjoins said second portion of said output opening.

4. An air outlet apparatus cooperating with an air conditioning system for supplying air to a predetermined interior comprising:
    a housing having two input openings, a first input opening for passing fresh air and a second input opening for passing air from the interior, and having an output opening; said output opening divided into two portions, a first portion being partially restricted and a second portion being unrestricted whereby air emitted through said first portion is directed by the air emitted through said second portion;
    said housing being formed to direct said input air substantially through a 180° path.

5. An outlet apparatus, as claimed in claim 4, wherein said housing is divided by a baffle causing said input air to move over said baffle before being emitted from said output opening.

6. An air outlet apparatus cooperating with an air conditioning system for supplying air to a predetermined interior comprising:
    a housing having two input openings, a first input opening for passing fresh air and a second input opening for passing air from the interior, and having an output opening; said output opening divided into two portions, a first portion being partially restricted and a second portion being unrestricted whereby air emitted through said first portion is directed by by the air emitted through said second portion;
    a wall of said housing adjacent said second portion of said output opening being curved in a direction along which emitted air is to be directed;
    said second input opening being positional adjacent said first portion of said output opening which, in turn, adjoins said second portion of said output opening; and
    said housing being formed to direct said input air substantially through a 180° path.

7. A compact air outlet apparatus cooperating with an air conditioning system of a vehicle for supplying air to the interior space of said vehicle comprising:
    a housing positioned behind a surface of said vehicle interior and having two input openings, a first input opening for passing fresh air and a second input opening for passing air from the interior of said vehicle;
    said housing also having an output opening divided into two portions, a first main portion and a second control portion, whereby air emitted through said first portion is directionally controlled by the air emitted through said second portion.

8. An outlet apparatus, as claimed in claim 7, wherein said housing is contiguous with said surface at the second control portion of said output opening and said second control portion directs air along said surface.

9. A compact air outlet apparatus cooperating with an air conditioning system of a vehicle for supplying air to the interior space of said vehicle comprising:

a housing positioned behind a surface of said vehicle interior and having two input openings, a first input opening for passing fresh air and a second input opening for passing air from the interior of said vehicle;

said housing also having an output opening divided into two portions, a first main portion and a second control portion, whereby air emitted through said first portion is directionally controlled by the air emitted through said second portion;

including a grill positioned to partially restrict the first main portion of said output opening.

10. An outlet apparatus, as claimed in claim 9, wherein said grill provides an air passage within the range of 45 to 65 percent of the air passage provided by the first main portion of said outlet opening when not partially restricted by said grill.

11. A compact air outlet apparatus cooperating with an air conditioning system of a vehicle for supplying air to the interior space of said vehicle comprising:

a housing having two input openings, a first input opening for passing fresh air and a second input opening for passing air from the interior of said vehicle;

said housing also has an output opening; and said housing is positioned behind a surface of said vehicle interior;

and additionally comprising an input duct positioned in said input section including said input opening, said input duct having a U-shaped end portion.

12. An outlet apparatus, as claimed in claim 11, wherein said input section includes said second input opening, whereby air emitted by said input duct causes air to be drawn into said input section of said housing passed said second input opening and mixed thereby with the air emitted from said input duct.

13. A compact air outlet apparatus cooperating with an air conditioning system of a vehicle for supplying air to the interior space of said vehicle comprising:

a housing having two input openings, a first input opening for passing fresh air and a second input opening for passing air from the interior of said vehicle;

said housing also has an output opening; and said housing is positioned behind a surface of said vehicle interior;

wherein said housing includes a compound curved wall portion and a baffle, said baffle dividing said housing into an input section and an output section.

14. An outlet apparatus, as claimed in claim 13, wherein:

said output opening is divided into two portions, a first main portion and a second control portion;

said curved wall portion is contiguous with the interior surface of said vehicle;

said second control portion directs air passing through it and through said first main portion of said output opening; and including a grill positioned to partially restrict the first main portion of said output opening.

15. An outlet apparatus, as claimed in claim 14, including an input duct positioned in said input section including said first input opening, said input duct having a U-shaped end portion.

16. An outlet apparatus for air conditioning system of a passenger aircraft mounted above the interior ceiling of the aircraft cabin space for supplying and circulating air within the cabin space comprising:

a housing mounted above said ceiling having an input opening in the ceiling to receive cabin space air, and input opening interior of said housing to receive fresh air and an output opening in said ceiling to pass mixed fresh and cabin space air into said cabin space, said output opening having a grill-covered main portion and a small uncovered control portion whereby said control portion directs the mixed air.

17. An outlet apparatus, as claimed in claim 17, including a second housing, each housing mounted to either side of a central longitudinal reference plane bisecting the aircraft cabin space and each creating a downward air flow along the side wall portion of said cabin space and an upward air flow along the center portion of said cabin space whereby movement of air from any seat position is either downward or upward.

* * * * *